(12) United States Patent
Truce (10) Patent No.: US 6,872,238 B1
(45) Date of Patent: Mar. 29, 2005

(54) METHOD AND APPARATUS FOR PARTICLE AGGLOMERATION

(75) Inventor: Rodney John Truce, Brisbane (AU)

(73) Assignee: Indigo Technologies Group Pty Ltd., Spring Hill (AU)

( * ) Notice: Subject to any disclaimer, the term of this patent is extended or adjusted under 35 U.S.C. 154(b) by 0 days.

(21) Appl. No.: 10/129,170

(22) PCT Filed: Nov. 10, 2000

(86) PCT No.: PCT/NZ00/00223

§ 371 (c)(1),
(2), (4) Date: May 1, 2002

(87) PCT Pub. No.: WO01/34854

PCT Pub. Date: May 17, 2001

(30) Foreign Application Priority Data

Nov. 11, 1999 (AU) .............................................. PQ3940
Jun. 7, 2000 (AU) .............................................. PQ8014

(51) Int. Cl.[7] .............................. B03C 3/013; B03C 3/36
(52) U.S. Cl. ...................... 95/29; 95/71; 95/78; 96/53; 96/62; 96/77; 96/87; 96/96; 96/97; 96/389
(58) Field of Search ............................. 96/52–54, 62, 96/70, 77, 79, 86, 87, 96–98, 100, 389; 95/29, 65, 71, 78

(56) References Cited

U.S. PATENT DOCUMENTS

| | | | |
|---|---|---|---|
| 4,935,209 A | 6/1990 | Pfoutz ........................ | 96/53 X |
| 5,547,493 A | 8/1996 | Krigmont ....................... | 96/54 |
| 5,601,791 A | 2/1997 | Plaks et al. ................... | 96/77 X |
| 5,665,147 A * | 9/1997 | Taylor et al. ................ | 96/98 X |
| 5,707,428 A | 1/1998 | Feldman et al. ............. | 96/97 X |
| 5,893,943 A | 4/1999 | Durham et al. ................ | 95/65 |
| 5,993,521 A * | 11/1999 | Loreth et al. ............... | 96/79 X |

FOREIGN PATENT DOCUMENTS

| | | |
|---|---|---|
| AU | A1-46213/79 | 3/1980 |
| CN | 1268408 A | 10/2000 |
| EP | 0 009 857 | 4/1980 |

OTHER PUBLICATIONS

"Fine Particulate Agglomeration in Laminar Flow ESP" by P.L. Feldman, et al. ; pp. 1–12 Feb. 1997.
"Acoustic Agglomeration of Power Plant Fly Ash for Environmental and Hot Gas Clean–Up" by G. Reethof; Transactions of the ASME vol. 110, Oct. 1998; pp. 552–557.
"An Experimental Study of Electrical Agglomeration of Fine Particals in an Alternating Electric Field" by Y.S. Kim, et al.; Proceedings ICESP VII, Korea; pp. 179–187, Sep. 20–25, 1998.
"A Experimental Investigation for Agglomeration of Aerosols in Alternating Electric Fields" by J. Klideso, et al.; Aerosol Science and Technology 23:1995, pp. 603–610.

(Continued)

*Primary Examiner*—Richard L. Chiesa
(74) *Attorney, Agent, or Firm*—Webb Ziesenheim Logsdon Orkin & Hanson, P.C.

(57) ABSTRACT

Fine particles of dust and other pollutants in gas streams are agglomerated to form larger particles which are more easily filtered in downstream processing. In one embodiment, particles in successive portions of the gas stream are charged with opposite polarity, and the gas stream is introduced into an Evasé portion (12) to slow it down. Particles of different sizes have differential deceleration and therefore mix generally in the direction of flow, leading to agglomeration of oppositely-charged particles. In another embodiment, a gas stream is divided into substreams in respective parallel passages, and the particles in adjacent passages are charged to opposite polarity. Deflectors at the downstream end of the passages cause substreams of particles of opposite polarity to mix, with resultant agglomeration of oppositely charged particles.

24 Claims, 8 Drawing Sheets

OTHER PUBLICATIONS

"Aerosol, Particle Concentration Reduction by Bipolar Agglomeration" by J. Hautanen, et al.; Oct. 1995.

Submicron Particle Agglomeration and Precipitation by Using a Bipolar Charging Method by S. Kanazawa, et al.; Journal of Electrostatics, 29; 1999; pp. 193–209.

"Agglomeration of Particles by AC Corona Discharge" by A. Zukeran, et al.; Electrical Engineering in Japan, vol. 130, No. 1, 2000, pp. 30–37.

"Electrical Induction of Particle Agglomeration" by U.R. Melcher, et al.; NTIS Publication No. PB205188, Aug. 1971.

* cited by examiner

METHOD AND APPARATUS FOR PARTICLE AGGLOMERATION

THIS INVENTION relates to method and apparatus for particle agglomeration. In particular, the invention is directed to electrostatic agglomerators for use in air pollution control.

BACKGROUND ART

Many industrial processes result in the emission of small hazardous particles into the atmosphere. For example, toxic airborne byproducts of coal combustion tend to concentrate in the fine particulate fraction of emissions due to the heavy metals and heavy organic material in the coal. Many of the trace metals, such as arsenic, cadmium, nickel, selenium and their compounds, volatise at the high combustion temperatures and either nucleate homogeneously or condense predominantly on the fine fly ash particles as the flue gases cool. The same is true of some of the hazardous organic air pollutants.

The toxic particles which are formed by homogenous nucleation are very fine sub-micron particles. As these fine particles are able to enter the human respiratory system, they pose a significant danger to public health. The identified combination of toxicity and ease of respiration has prompted governments around the world to enact legislation for more stringent control of emission of particles less than ten microns in diameter (PM10), and particularly particles less than 2.5 microns (PM2.5). Government regulations controlling particulate emissions are likely to become more stringent in the future, especially for fine particles in the micron and sub-micron size range, as the hazardous effects of such particulate emissions become more widely known.

Smaller particles in atmospheric emissions are also predominantly responsible for the adverse visual effects of air pollution. For example, in coal burning installations, stack opacity is largely determined by the fine particulate fraction of the fly ash because the light extinction coefficient peaks near the wavelength of light which is between 0.1 and 1 microns.

The importance of fine particulate control can be appreciated by consideration of the number of pollutant particles in an emission rather than the pollutant mass. In fly ash from a typical coal combustion process, pollutant particles less than 2 microns in size may amount to only 7% of the total pollutant mass, yet account for 97% of the total number of particles. A process which removes all the particles greater than 2 microns may seem efficient on the basis that it removes 93% of the pollutant mass, yet 97% of the particles remain, including the more respirable toxic particles.

Various methods have been used to remove dust and other pollutant particles from air streams. Although these methods are generally suitable for removing larger particles from air streams, they are usually much less effective in filtering out smaller particles, particularly PM2.5 particles.

It is known to use particle agglomeration techniques to combine smaller particles into larger particles, which can then be removed more easily or effectively. Known agglomeration techniques include: (i) injection of chemicals into air streams to increase agglomeration of fine particles, (ii) use of laminar flow precipitators to promote surface agglomeration of fine particles, (iii) acoustic agitation of dust particles suspended in a gas to increase impingement and hence agglomeration rates, (iv) AC or DC electric field agitation of charged dust particles suspended in a gas to increase mixing and hence agglomeration, and (v) bipolar charging of particles in a gas stream for electrostatic attraction.

An example of a known surface agglomeration technique can be found in U.S. Pat. No. 5,707,428, while an example of the AC field agitation method can be found in European patent application no. 0009857.

These techniques are usually costly to implement in large scale installations, and the chemical injection method raises other health concerns. Further, the known techniques are not particularly efficient in relation to fine dust particles.

The most common agglomeration technology is surface agglomeration. In surface agglomeration techniques, particles must be brought into contact with a collecting surface or body to be removed from the gas stream. Large particles, greater than about 10 microns in diameter, are captured relatively easily by inertial mechanisms such as impaction, interception and centrifugal forces. In electrostatic precipitators, large particles are more easily collected as they experience greater electrical forces due to their capacity for greater charge.

However, as particle size decreases, the mass of the particle decreases in proportion to the cube of the diameter, and inertial forces are less effective in bringing the particles to a collecting surface. These small particles also hold less charge, and therefore experience smaller electrostatic forces. For particles less than 0.1 micron, diffusion is usually the main mechanism for particle transport, charging and capture. For particles between 0.1 and 2 microns however, neither diffusive, electrostatic nor inertial mechanisms are very strong, and known devices which utilise these mechanisms usually exhibit minimum collection efficiency in this size range.

The effectiveness of diffusive capture may be increased by providing greater surface area and/or more time for diffusion to occur, but a significant increase in equipment size is required. Greater inertial forces can be obtained by increasing the relative velocity of the particle to the collecting surface, but at the expense of greater pressure drop and power input to the collecting device, which results in greatly increased costs. Hence, economic considerations have limited these approaches.

Other dust collection devices that have been used for fine particle emission control include wet electrostatic precipitators and scrubbers. These normally require large and expensive installations, and give rise to the problem of disposal of contaminated wastewater. Fabric filters have also been used as dust collectors, but they tend not to be efficient collectors of fine particles as the small and generally smooth particles tend to bleed through the fabrics used in such filters.

It is an object of this invention to provide an improved method and apparatus for particle agglomeration.

SUMMARY OF THE INVENTION

In one broad form, the invention provides apparatus for agglomerating particles in a gas stream, comprising
an ion generator for electrically charging particles in the gas stream to opposite polarities, and
a formation located downstream of the ion generator for physically altering the flow of the gas stream to cause mixing of oppositely charged particles and thereby promote agglomeration of the particles.

In another form, the invention provides a method of promoting agglomeration of small particles in a gas flow, comprising the steps of
electrically charging particles in the gas flow to opposite polarities, and physically altering the flow of the gas stream to cause mixing of oppositely charged particles and thereby promote agglomeration of the particles.

Although it is known to use ionisers to charge particles in a gas stream, prior art techniques mainly relied on diffusion to bring the charged particles into proximity to allow the electrostatic forces to become effective. As mentioned above, these techniques are usually inefficient. This invention involves physical alteration of the gas flow to promote mixing of oppositely charged particles.

The invention can be implemented economically as it uses a relatively simple passive formation downstream of the ioniser to mix oppositely charged particles and thereby promote their agglomeration.

In one embodiment, an AC ioniser is used to charge particles in successive portions of the gas stream to opposite polarities. The AC ioniser may comprise an electrode array orientated transversely across the gas stream, to which voltage pulses of alternative polarity are successively applied. The electrode array may comprise a series of spaced elongate members having pointed projections thereon which generate ion discharge.

The formation may be an Evasé portion or the like, in which the cross sectional area of the gas stream is expanded to thereby slow down the gas stream. Due to differential movement of the particles in the gas stream in the direction of flow, particles of one polarity from a portion of the gas stream will mix with particles of opposite polarity from a leading or following portion. When such oppositely charged particles come into close proximity, they are more likely to be attracted to each other and therefore agglomerate.

In another embodiment, the ion generator is a bipolar DC ioniser which charges particles in adjacent portions across the gas stream to opposite polarities. The DC ioniser may comprise a plurality of spaced electrode arrays arranged transversely across the gas stream, each electrode array being connected to a DC voltage so that adjacent electrode arrays are of opposite polarity.

Each electrode array is orientated in the direction of flow of the gas stream and may comprise a series of spaced elongate members having pointed projections. Planar members may be located between the electrode arrays and orientated parallel thereto. The planar members provide earthed surfaces.

In the second embodiment, the formation may comprise gas flow deflectors downstream of respective electrode arrays for mixing adjacent portions of the gas stream containing particles charged to opposite polarity by adjacent electrode arrays.

The mixing of the charged particles may be enhanced by acoustic agitation downstream from the ionisers.

The particles may also be pretreated by spraying with a chemical compound, such as ammonia, to increase their "adhesiveness".

In order that the invention may be more fully understood and put into practice, preferred embodiments thereof will now be described with reference to the accompanying drawings.

DESCRIPTION OF PREFERRED EMBODIMENTS

Figure 1:
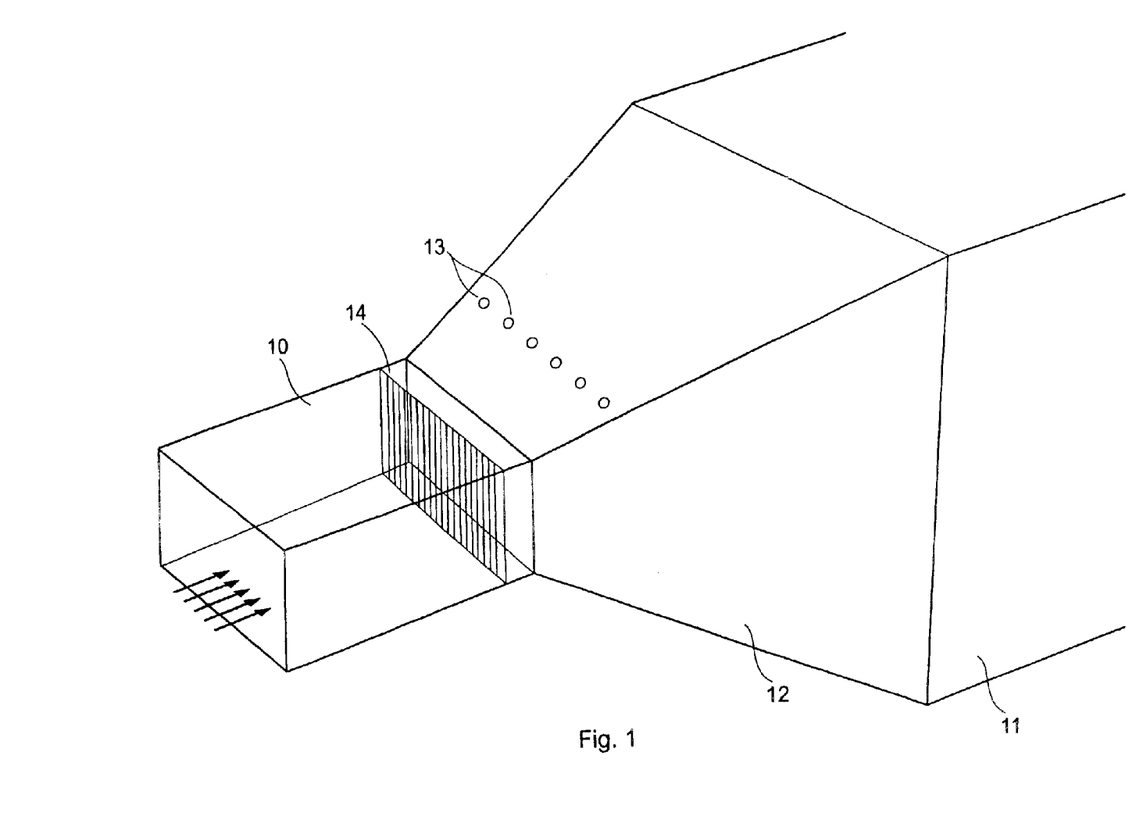
FIG. 1 is a schematic perspective view of a particle agglomerator according to one embodiment of the invention, using a AC ioniser.
Figure 2:
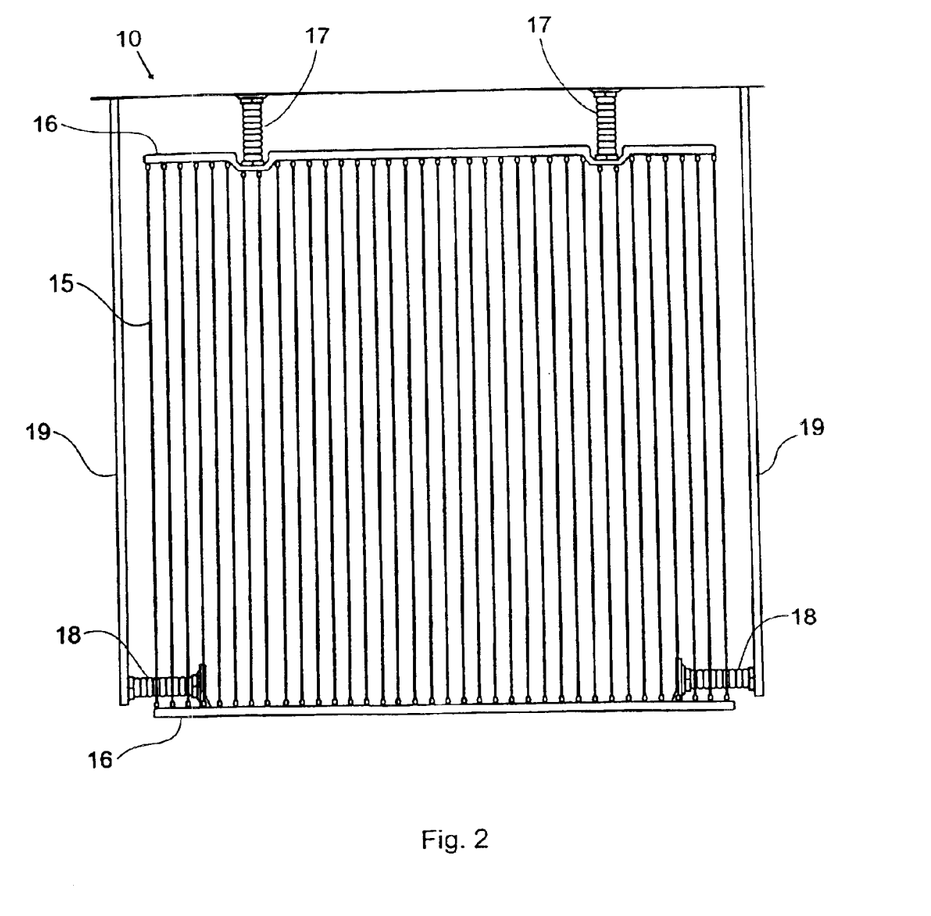
FIG. 2 is an elevational view of the AC ioniser of FIG. 1, FIGS. 3(a) to 3(f) illustrate alternative barbed electrode wires for the ioniser of FIG. 2.
Figure 3:
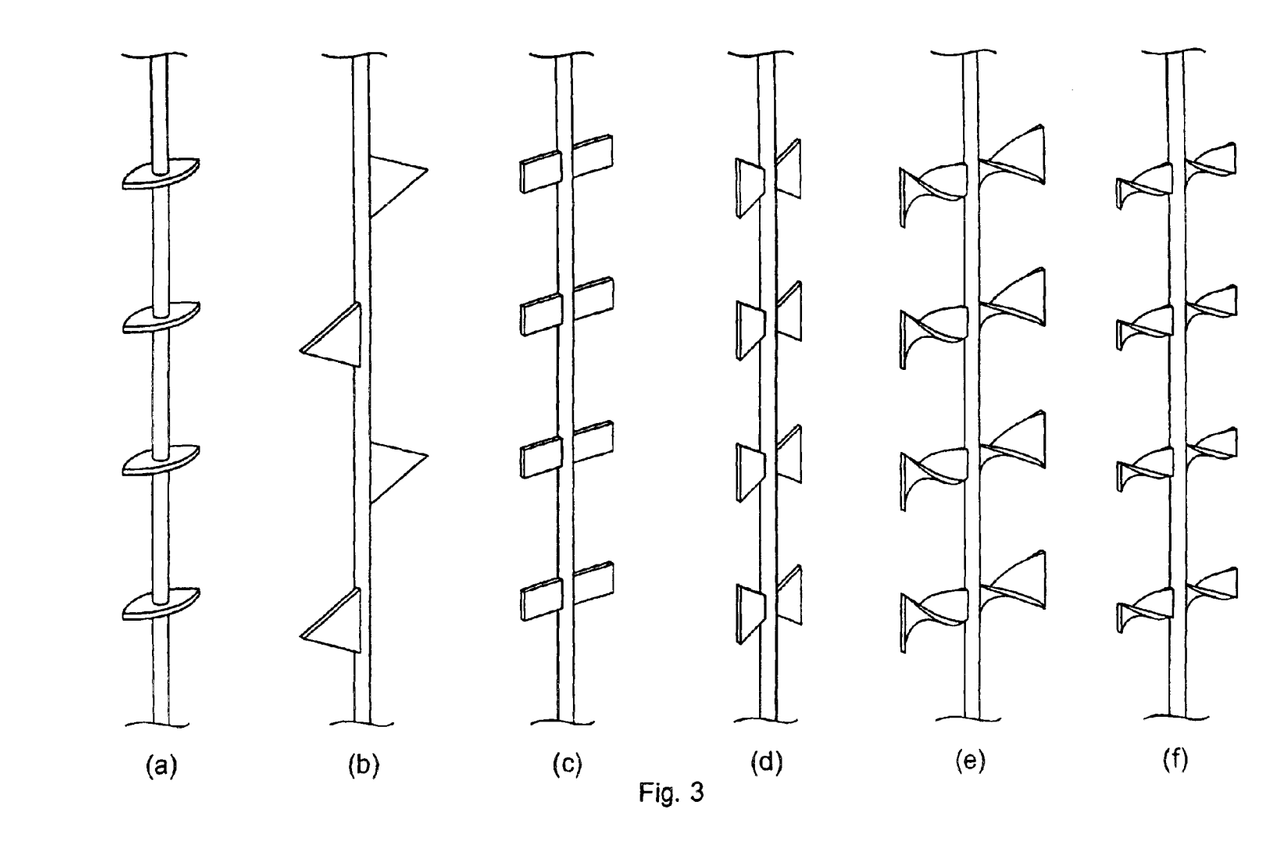

FIGS. 1–3 illustrate a first embodiment of the particle agglomeration apparatus of this invention. In this embodiment, precharged particles of different sizes in an airstream are caused to have differential speeds so as to promote mixing of the particles in the longitudinal direction of motion. The enhanced mixing results in agglomeration of the particles.

As shown in FIG. 1, a duct 10 of substantially constant cross section is connected to a second duct 11 having a substantially constant cross section which is significantly greater than the cross section of duct 10. The duct 10 is connected to the duct 11 by an Evasé portion 12 which has a progressively increasing cross section. The ducting 10, 11, 12 provides a conduit for a gas stream.

An AC ioniser 14 is located in the duct 10 to charge the particles in the gas stream. The AC ioniser 14, which is shown schematically in block form in FIG. 1, is shown in more detail in FIG. 2. The AC ioniser 14 comprises a series of spaced electrodes 15 strung between top and bottom busbars 16. The top busbar 16 is supported from the roof of the duct 10 by insulators 17, while the bottom busbar 16 is connected via insulators 18 to support rods 19 which depend from the roof of the duct. The electrodes 15 are arranged in a vertical planar array which is mounted transversely across the passageway in duct 10. The electrodes 15 are connected to a source of high voltage AC via suitable voltage control circuitry (not shown). The AC supply is preferably greater than 1 kV, and typically 20 kV to 100 kV.

The electrodes 15 may suitably be single strand or multistrand wires, or in mesh form. Preferably, the electrodes 15 are barbed wires or strips having sharp points, barbs or prongs along their length. Examples of such electrodes are shown in FIG. 3.

The electrodes 15 may be manufactured from flat strip which is provided with V-shaped barbs on one or both sides. These barbs may be in the same plane as the flat strips, or twisted at an angle to improve ion generation and distribution. The barbs or other sharp points on the electrodes may be twisted or angled to direct the ions in the desired directions, and the spacing of the electrodes 15 may be varied to modify the ion generating corona characteristics. The level of ion generation is generally dependant on the number of barbs or sharp points along the electrodes. The ends of the electrodes 15 may be provided with springs so that the electrodes can be mounted between the busbars under the tension to keep them straight.

The high voltage applied to the electrodes generates intense electric fields around the points, barbs or prongs, creating corona discharges. The ions discharged by the electrodes 15 attach to passing particles in the gas stream, thereby charging the particles. Although ordinary wire electrodes will generate ions to charge the particles, the use of such barbed electrodes results in greater ion generation.

The high voltage AC supply to the electrodes 15 is controlled by a microprocessor-based controller using solid state power switches, such as SCRs or IGBTs to regulate the voltage supplied to the electrodes. This voltage is suitably regulated to maximise ion generation, without sparking or arcing over.

In use, the first duct 10 receives a gas stream containing dust and/or other pollutant particles, at a relatively high velocity. An AC voltage as shown in FIG. 4(a) is switched so that pulses of opposite polarity are applied successively to the electrodes 15. Typical voltage pulse waveforms applied to the electrodes 15 are shown in FIGS. 4(b) and 4(c). For 50 Hz AC, a plurality reversal occurs every 10 ms. This period can be increased by skipping cycles to reduce the frequency of polarity reversal as shown in FIG. 4(d). Alternatively, the frequency of the AC supply may be varied.

The polarity of the ions generated by the electrodes 15 will alternate with time. Since the ions charge particles in the passing gas stream, the gas stream beyond the AC ioniser will contain successive transverse sections of oppositely charged particles, spaced in the direction of motion.

The duct formation downstream of the ioniser 14 changes the flow characteristics of the gas stream. Namely, when the gas stream enters the Evasé portion 12, its volume will increase and there will be a corresponding decrease in the average speed of the gas. As the particles in the incoming gas stream will be of different sizes, they will have different kinetic energy and momentum. Consequently, the larger particles will not decelerate as quickly as the smaller particles. Due to their differential speeds, the different sized particles will mix in the general direction of motion of the gas. That is, some particles of one polarity in a transverse section of the gas stream will mix with particles of a different polarity from other sections. As the oppositely charged particles come into close proximity, they will be attracted to each other and agglomerate into larger sized particles.

The gas stream can then be fed to other dust collection devices, such as electrostatic precipitators or fabric filters, where the increased particle size will enable such devices to collect the dust more effectively. Agglomeration will also reduce the health hazard by making the dust particles larger, and hence less likely to be absorbed through the human respiratory system.

The transverse expansion of the gas stream to fill the increasing sectional area of the Evasé portion 12 also promotes mixing of the different sized particles in the gas stream, with the smaller particles being more likely to move laterally across the paths of oppositely-charged larger particles.

Agglomeration can be enhanced by pretreating the particles. A suitable pretreatment method involves spraying the gas stream with ammonia. The ammonia will increase the "stickiness" or adhesiveness of the dust particles, and hence increase the strength of the bond between the agglomerated particles.

The mixing of the particles in the Evasé portion 12 can be further promoted by acoustic agitation using a series of speakers or vibrators 13 mounted on the Evasé portion 12, or by physical devices or formations such as screens, winged vortex generators or other deflectors which cause turbulence in the gas flow.

In order to enhance particle charging and reduce particle buildup on the duct walls, an electrically-insulating coating may be applied to the inside of the high velocity duct 10 and the Evasé portion 12. This will prevent dissipation of ions to an earthed metal duct, and therefore increase the ion density in the gas stream. Electrically isolating the housing of the duct 10 and the Evasé portion 12 will also prevent the charged dust particles from being electrically attracted and adhering to earth steel ductwork.

The AC ioniser 14 may comprise additional planar arrays of electrodes 15 mounted across the duct passageway. Where several spaced electrode arrays 115 are used, the timing and shape of the AC voltage pulses applied to the electrode arrays are controlled to optimise particle charging and avoid charge cancellation in subsequent arrays.

A second embodiment of the invention is illustrated in FIGS. 5 to 9. In this embodiment, the gas stream containing the dust particles and other pollutants is divided into a series of parallel substreams which are passed through a bipolar charger so that the particles in adjacent substreams are charged to opposite polarity. The substreams are then deflected to cause adjacent substreams to merge and/or cross, thereby promoting mixing of the particles and enhancing agglomeration. That is, as the substreams merge or cross, oppositely charged particles will come into close proximity and will be attracted to each other. Consequently, they agglomerate into larger particles which can be filtered more easily from the gas stream subsequently, using known techniques.

Figure 5:
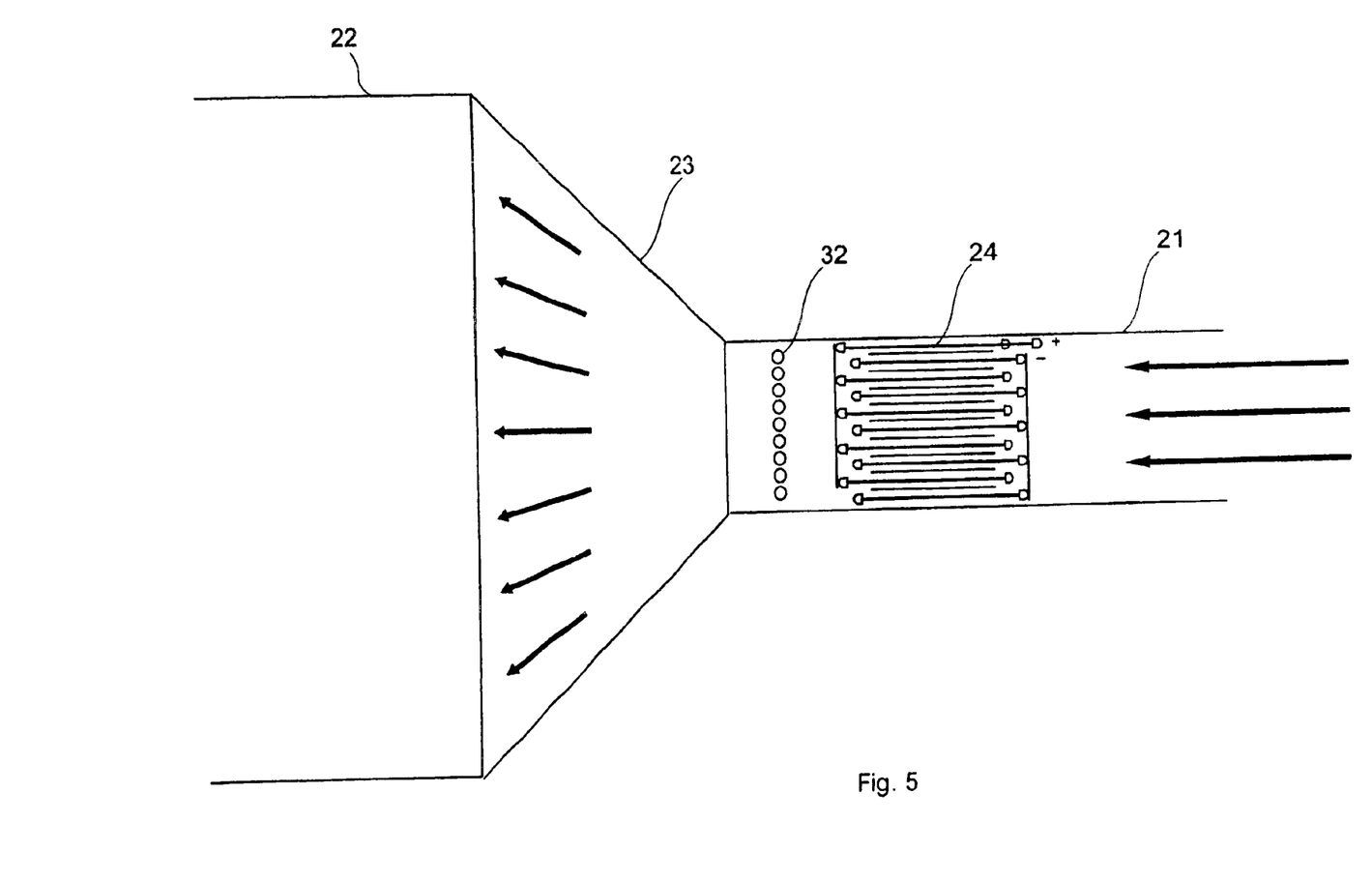
FIG. 5 is a schematic plan view of a particle agglomerator according to a second embodiment of the invention, using a bipolar DC ioniser.

As shown in FIG. 5, a duct 21 receives a high velocity flow of gas containing dust particles and other contaminants, in the direction shown by the arrows. The duct 21 may be connected to a larger duct 22 via an Evasé portion 23, in order to slow the gas for subsequent filtering or discharge. A bipolar ioniser and agglomerator 24 is located within duct 21, and is shown in more detail in FIGS. 6–9.

The bipolar ioniser 24 comprises a series of parallel planar electrode arrays 25 aligned with the direction of flow, and spaced across the duct 21. In the illustrated embodiment, the electrode arrays 25 are vertical, but they may be horizontal or angled if desired. Each electrode array 25 comprises a series of spaced wires or flat strips extending between top and bottom busbars 26 which serve as supports for the wires or strips. The electrode arrays can be constructed as described above with respect to FIGS. 2 and 3. Instead of barbed wires or strips as illustrated above in FIGS. 2 and 3, the electrode arrays may be mesh, multistrand wire or other suitable construction to promote ion generation.

Figure 6:
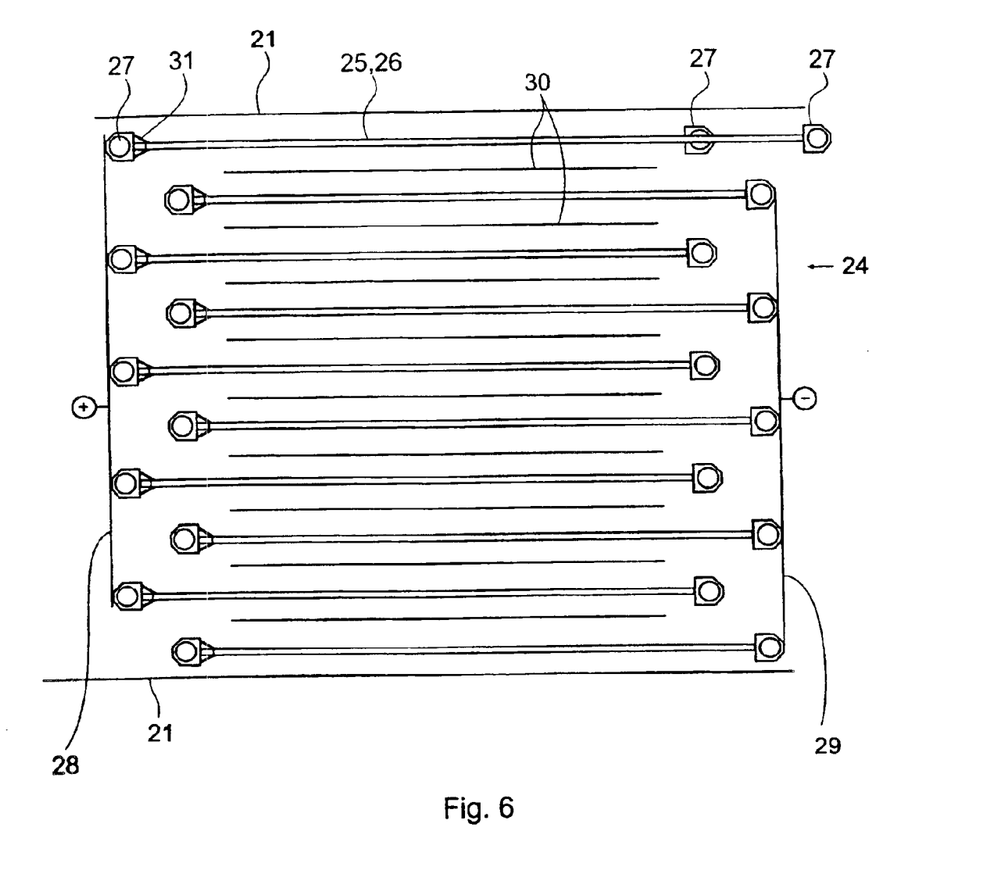
FIG. 6 is a plan view of the bipolar ioniser of FIG. 5.
Figure 7:
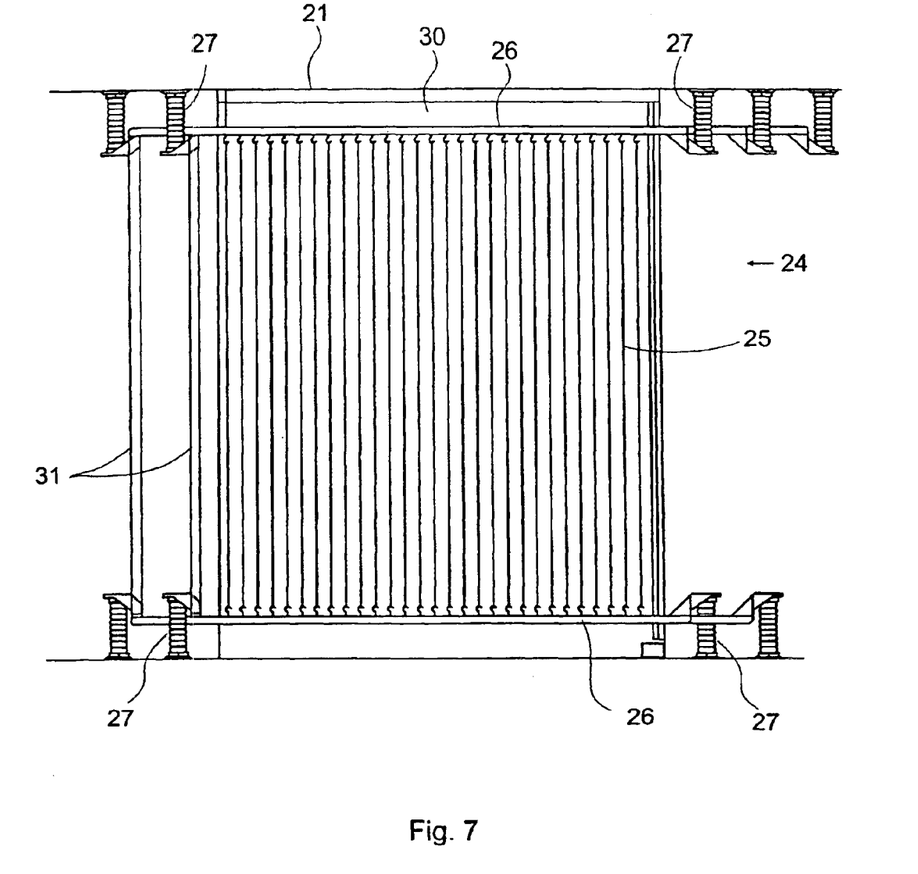
FIG. 7 is an elevational view of the bipolar ioniser of FIG. 5.

Each electrode array 25 is mounted to the walls of the duct 21 by insulators 27. The odd-numbered electrode arrays are electrically connected by a busbar 28, while the even-numbered electrode arrays are electrically connected together by busbar 29. In use, busbars 28, 29 are connected respectively to the positive and negative outputs of a high voltage DC supply, so that adjacent electrode arrays are charged to opposite polarities.

The DC voltage is preferably greater than 1 kV, and typically 20 kV to 100 kV. The DC voltage supply is suitably controlled by a microprocessor-based controller using solid state power switches. Both the positive and negative voltages supplied to the bipolar ioniser 24 are independently regulated to ensure maximum balanced ion generation without sparkover.

Earthed planar members such as screens or plates 30 may optionally be located between the electrode arrays 25, as shown in FIG. 6. Thus, the gas stream entering the bipolar ioniser will be divided into parallel substreams located between the earthed plates 30 (or between the earthed plates 30 and the earthed duct wall 21). The ionising electrodes 25 are suspended in the centre of each passage. Each substream flows along both sides of an electrode array and is effectively divided lengthwise by the electrode array.

Ions generated by the electrode arrays 25 will move towards the earthed surfaces and be attracted to passing dust particles suspended in the substreams, thereby charging those particles. The ionising electrodes 25 in odd passages have the opposite polarity to the ionising electrodes in the even passages, such that the dust particles in adjacent passages are of opposite polarity.

The passages defined between the earthed plates 30 are typically between 200 mm and 1000 mm wide, and are of sufficient length in the direction of flow to ensure that the dust particles are charged as they travel through the passages. In a typical installation in a duct 4 m wide, ten parallel passages are formed, each of 400 mm width and 8 m long.

Figure 8:
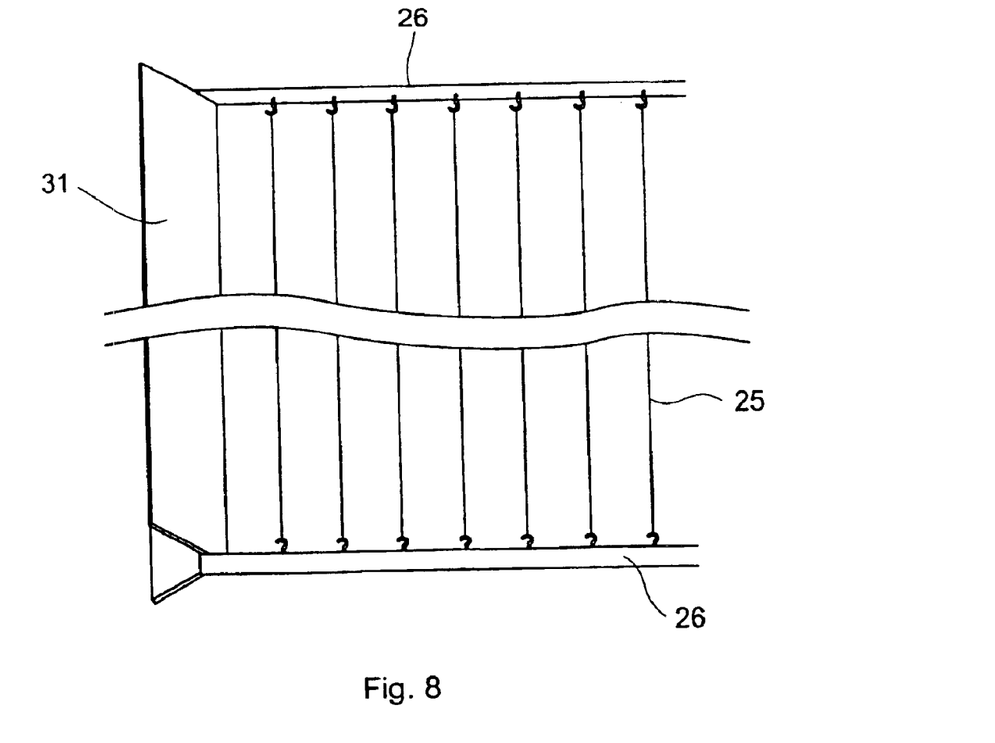
FIG. 8 is a fragmentary perspective view of an electrode array of the bipolar ioniser of FIG. 5, illustrating an air deflector.
Figure 9:
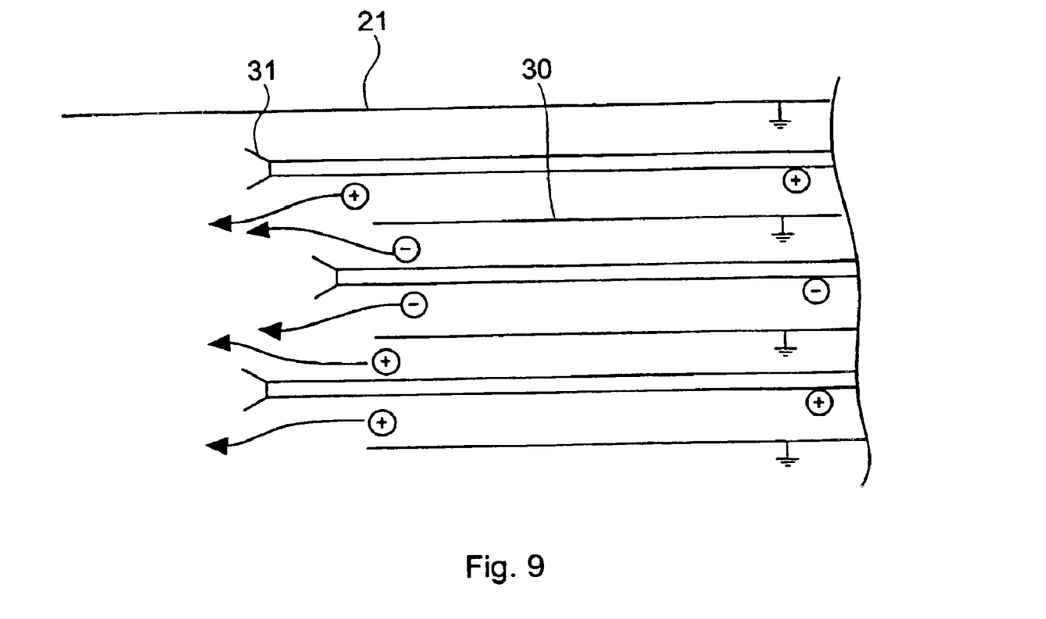
FIG. 9 is a schematic plan view illustrating air flow around the air deflectors.

A V-shaped deflector 31 is provided at the end of each electrode array 25, as can be seen more clearly in FIG. 8. The deflector creates turbulence at the: downstream end of the bipolar ioniser 24 to enhance mixing of the charged dust particles. Proximate oppositely charged particles will be attracted to each other and bond, resulting in particle agglomeration. More particularly, the V-shaped deflectors deflect the substreams such that adjacent portions of adjacent substreams having particles charged to opposite polarity are merged or crossed, as shown in FIG. 9. Such deflection pattern promotes mixing of oppositely charged particles, thereby enhancing agglomeration.

Although a V-shaped deflector is illustrated, any shape that will cause effective mixing of the oppositely charged particles may be used, such as a flat transverse plate which will increase the turbulence downstream, and hence mixing.

Figure 4:
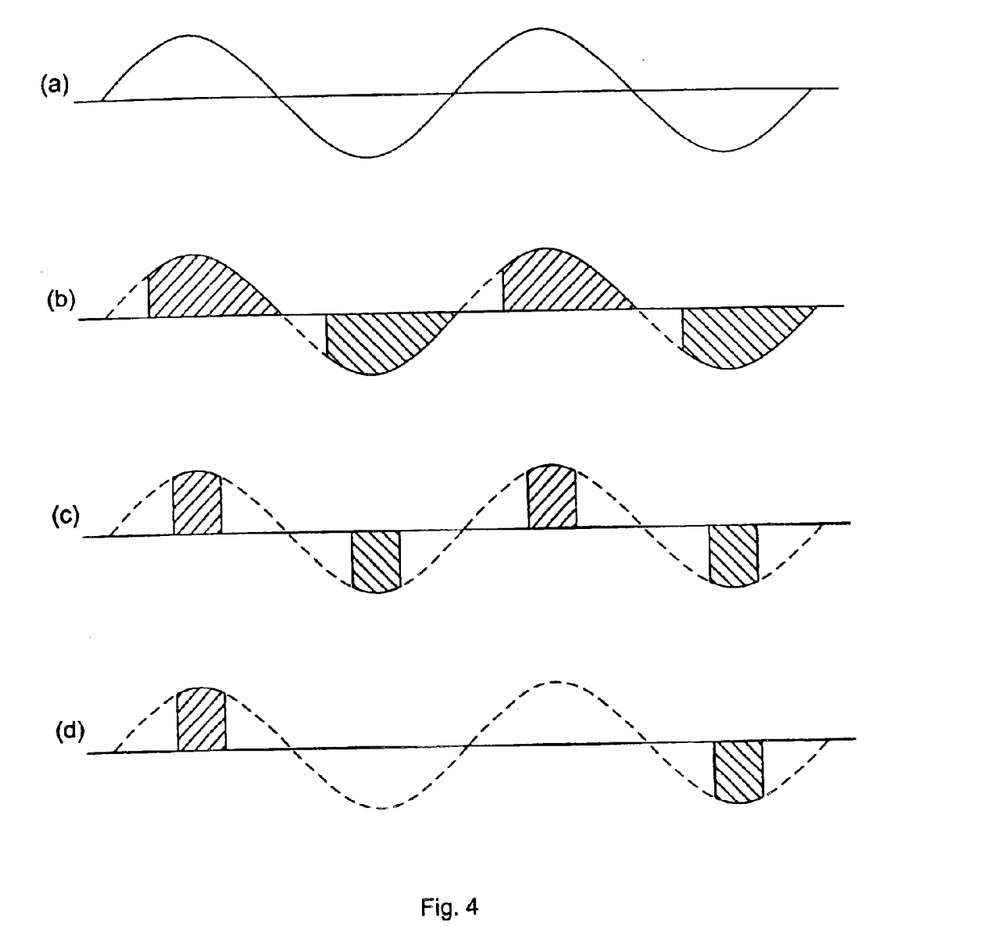
FIGS. 4(a) to 4(d) illustrates voltage waveforms applied to the AC ioniser of FIG. 2.

The turbulent mixing downstream of the bipolar ioniser 24 can be further enhanced by acoustic agitation, using a series of speakers or vibrators 32 mounted on the duct 21 (FIG. 4). Other suitable particle agitation devices may also be used.

When the gas travels through the Evasé portion 23, it slows down as it expands in volume. Different sized particles decelerate at different rates, causing further mixing of the charged particles in the direction of flow, and agglomeration.

As mentioned above in relation to the embodiment of FIGS. 1–3, an electrically insulating coating may be applied to the inside of the duct 21 and the Evasé portion 23 to prevent ions dissipating to an earthed surface, and thereby increase the ion density in the gas. Dust collection hoppers may also be provided below the ionising passages in the bipolar ioniser 24 to collect dust that falls from the passage walls.

As with the first embodiment, the gas fed to duct 21 may be pretreated with ammonia or other chemical(s) to increase the adhesiveness of the particles.

The foregoing describes only some embodiments of the invention, and modifications which are obvious to those skilled in the art may be made thereto without departing from the scope of the invention as defined in the following claims. For example, the V-shaped deflectors 31 may be mounted at the trailing end of the plates 30 instead of the electrode arrays 25. The deflectors may also be orientated horizontally instead of vertically as illustrated.

Although V-shaped deflectors are depicted in the drawings, other shapes or configurations may be used for the deflectors, including horizontal louvres, shaped plates and winged devices to create mixing vortexes.

The winged devices may be of a delta shape and angled to the direction of gas flow so as to cause vortexes to form at the trailing tips of the delta wing.

Several rows of deflectors may be arranged in staggered formation to provide successive deflection and mixing of substreams, resulting in thorough mixing and greater opportunity for particles to agglomerate.

Further, the electrode arrays 25 may be energised intermittently, rather than continuously.

Still further, a tubed or honeycomb array may be used in the bipolar ioniser in place of the parallel passages, with high intensity ionisers producing bipolar ions to charge the particles.

Throughout the specification and claims, where the context permits, the term "comprises" or "comprising" is to be interpreted in the inclusive sense, as including the recited integers without necessarily excluding others.

What is claimed is:

1. An apparatus for agglomerating particles in a gas stream, comprising
    an ion generator for electrically charging particles in different portions of the gas stream to opposite polarities so that the particles in one portion of the gas stream are charged to one polarity and the particles in another portion of the gas stream are charged to the opposite polarity, and
    a formation located downstream of the ion generator for physically altering the flow of the gas stream to cause effective mixing of oppositely charged particles so that particles of opposite polarity come in close proximity to each other and thereby promote agglomeration of the particles into larger-sized particles.

2. The apparatus as claimed in claim 1, wherein the ion generator is an AC ioniser for charging particles in successive portions of the gas stream to opposite polarities.

3. The apparatus as claimed in claim 2, wherein the AC ioniser comprises at least one electrode array orientated transversely across the gas stream, and an electrical circuit for applying voltage pulses of alternative polarity to the electrode array.

4. The apparatus as claimed in claim 3, wherein the electrode array comprises a series of spaced elongate members having pointed projections thereon.

5. The apparatus as claimed in claim 2, wherein the formation is an Evasé portion in which the cross sectional area of the gas stream is expanded, thereby slowing down the gas stream.

6. The apparatus as claimed in claim 5, further comprising at least one acoustic agitation device for agitating particles in the gas stream in the Evasé portion.

7. The apparatus as claimed in claim 5 further comprising one or more physical formations in the Evasé portion to create turbulence to increase mixing of the particles.

8. The apparatus as claimed in claim 1, wherein the ion generator is a bipolar DC ioniser for charging particles in adjacent portions across the gas stream to opposite polarities.

9. The apparatus as claimed in claim 8, wherein the DC ioniser comprises a plurality of spaced electrode arrays arranged transversely across the gas stream, each electrode array being connected, in use, to a DC voltage, and adjacent electrode arrays being of opposite polarity.

10. The apparatus as claimed in claim 9, wherein each electrode array is orientated in the direction of flow of the gas stream and comprises a series of spaced elongate members having pointed projections thereon.

11. The apparatus as claimed in claim 9, further comprising planar members located between the electrode arrays and orientated parallel thereto, the planar members providing earthed surfaces.

12. The apparatus as claimed in claim 8, wherein the formation comprises at least one gas flow deflector for causing the adjacent portions to mix.

13. The apparatus as claimed in claim 9, wherein the formation comprises one or more V-shaped gas flow deflectors mounted at the downstream end of the respective electrode arrays for mixing adjacent portions of the gas stream containing particles charged to opposite polarity by adjacent electrode arrays.

14. The apparatus as claimed in claim 8, further comprising at least one acoustic agitation device for agitating particles in the gas stream downstream from the DC ioniser.

15. The apparatus as claimed in claim 8, further comprising one or more physical devices located downstream of the ioniser for creating turbulence in the gas stream.

16. A method of promoting agglomeration of small particles in a gas stream, comprising the steps of
    electrically charging particles in different portions of the gas stream to opposite polarities so that the particles in one portion of the gas stream are charged to one polarity and the particles in another portion of the gas stream are charged to the opposite polarity, and
    physically altering the flow of the gas stream to cause effective mixing of oppositely charged particles so that particles of opposite polarity come in close proximity to each other and thereby promote agglomeration of the particles into larger-sized particles.

17. The method as claimed in claim 16, wherein particles in successive portions of the gas stream are charged to opposite polarities by an AC ioniser.

18. The method as claimed in claim 17, wherein the formation comprises an Evasé portion in which the cross sectional area of the gas stream is expanded to thereby slow down the gas stream.

19. The method as claimed in claim 16, wherein particles in adjacent portions across the gas stream are charged to opposite polarities by a bipolar DC ioniser.

20. The method as claimed in claim 19, wherein the flow of the gas stream is altered by deflectors which cause the adjacent portions to mix.

21. The method as claimed in claim 16, further comprising the step of acoustically agitating the electrically charged particles in the gas stream.

22. The method as claimed in claim 16, further comprising the step of spraying particles in the gas stream with a chemical compound prior to the charging step to increase adhesiveness of the particles.

23. The method as claimed in claim 22, wherein the chemical compound is ammonia or an ammonia-based compound.

24. An apparatus for promoting agglomeration of micron and sub-micron sized particles in a gas flow comprising
    means for electrically charging particles in different portions of the gas flow to opposite polarities so that the particles in one portion of the gas flow are charged to one polarity and the particles in another portion of the gas flow are charged to the opposite polarity, and
    means for physically altering the flow of gas downstream of the charging means to cause effective mixing of oppositely charged particles so that particles of opposite polarity come in close proximity to each other and thereby promote agglomeration of the particles into larger-sized particles.

* * * * *